Figure 1:

J. R. McCLAIN.
WOOD VENEER.
APPLICATION FILED MAR. 13, 1918.

1,299,747.

Patented Apr. 8, 1919.

WITNESSES:
Ed. V. Herron
W. W. Woodman.

INVENTOR
John R. McClain
BY
ATTORNEY

UNITED STATES PATENT OFFICE.

JOHN R. McCLAIN, OF EDGEWOOD, PENNSYLVANIA, ASSIGNOR TO WESTINGHOUSE ELECTRIC & MANUFACTURING COMPANY, A CORPORATION OF PENNSYLVANIA.

WOOD VENEER.

1,299,747.     Specification of Letters Patent.     Patented Apr. 8, 1919.

Application filed March 13, 1918. Serial No. 222,056.

*To all whom it may concern:*

Be it known that I, JOHN R. McCLAIN, a citizen of the United States, and a resident of Edgewood, in the county of Allegheny and State of Pennsylvania, have invented a new and useful Improvement in Wood Veneers, of which the following is a specification.

My invention relates to the manufacture of plural-layer structures known as compound lumber, and it has, for its primary object, to provide an inexpensive and efficient method of manufacture whereby exceptionally satisfactory and durable compound lumber may be produced.

Under present conditions, as known to me, in making compound lumber, a so-called wet process is employed, a glue or equivalent adhesive, in a fluid or semi-fluid state, being applied to the surfaces of the sheets of wood or other material to be joined together, either by means of a brush or by dipping the sheets in the adhesive.

This method is open to many objections, but, up to the present time, there has been, apparently, no means of improving it to overcome such objections. Obviously, dipping the sheets in the adhesive or applying the adhesive with a brush provides the surfaces of the sheets with a non-uniform coating. This results in non-uniformity of the finished product and a waste of the adhesive material as a surplus of such material must be used in order to insure the presence of an adhesive film between all parts of the surfaces to be united.

Furthermore, when an adhesive is employed which hardens under heat and pressure, such as one of the phenolic condensation products, for instance, bakelite, the solvent employed for the adhesive is expensive, must be used in relatively large quantities and is a total loss, being driven off by the heat employed in hardening the adhesive. In plural-layer wooden structures, also, the solvent employed with the phenolic condensation product is, in part, absorbed by the wood and interferes with the proper curing or hardening of the adhesive, sometimes making the hardened adhesive porous in structure. This is caused by the driving off of the solvent, as gases and vapors, through the adhesive during its curing under heat.

With the wet processes employed, considerable expense results from the time and labor expended in brushing the liquid glue over the surfaces to be joined. Furthermore, the resulting products may be defective because of a partial drying of the coated surfaces that sometimes occurs before the various sheets are assembled and the adhesive hardened.

My invention broadly consists in impregnating sheets of porous, and preferably fibrous, material, of any desired character, such as paper, fabric or a felted material, as, for example cotton batting, with a predetermined percentage of the desired adhesive and then employing a dried sheet of this impregnated material as a binding sheet by interposing it between the sheets of wood or other material to be united.

Obviously, the cost is materially reduced when a dry process of this character is practised, due to the fact that the fibrous sheets may be treated in continuous rolls, by machinery, being passed through a relatively heavy solution of the desired adhesive and, between adjustable pressure rolls which force out all surplus adhesive and then through a drying tower to drive off any solvent taken up by the material.

In practising my invention, sheets of previously impregnated fibrous material may be cut to the exact size and shape of the layers of wood or other material to be united and be interposed between the opposed surfaces of such layers. The stacked body, thus formed, may then be treated in a suitable manner, as by the application of heat and pressure, to first soften the adhesive, to bring it into intimate contact with the surfaces to be united, and to then harden it, so that a strong bond between such surfaces is provided. If a glue, which softens under heat and hardens upon cooling, is employed, the stacked or built-up body is first subjected to heat and pressure and then, while still under pressure, is cooled. If, on the other hand, a phenolic condensation product is employed as the adhesive or binder, the stacked body is subjected to heat and pressure to first soften the binder and then to transform it to its solid, substantially insoluble and infusible form.

This process of forming compound lumber, which I term the dry process, possesses many advantages over the various wet processes previously known. The impregnating of the fibrous material may be economically done, as practically no manual labor is necessary. Furthermore, only a small quantity of solvent, which is ultimately eliminated, is required, as the adhesive may be employed in a heavy viscous state, due to the fact that it will be forced through and into the sheet material between the pressure rolls. In addition to this, by proper adjustment of the pressure rolls, all surplus adhesive will be forced from the impregnated material so that an absolutely uniform and predetermined degree of impregnation may be quickly and economically attained. In addition to these features, the small amount of solvent employed is removed in the drying tower previous to the use of the sheet material as a binder so that none of this solvent remains to be absorbed by the layers which are united to constitute the finished product, with the result that a solid and uniform bond will be provided between the layers of wood or other material.

Besides these features, the fibrous sheet material substantially increases the strength of the finished product, particularly when layers of wood are united, as it provides a strong, though thin, supporting sheet between the adjacent layers of wood. This tends to prevent any splitting or breaking away of any part of the lumber.

Figure 2:
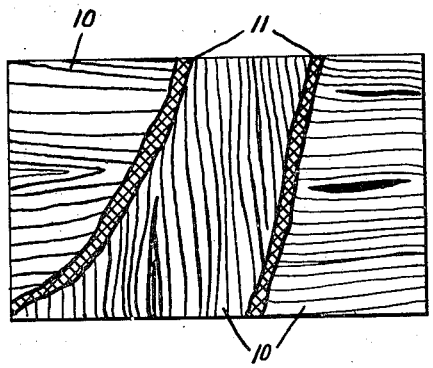
Figure 3:
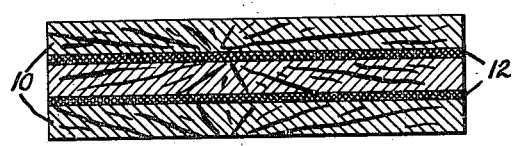
Figure 4:
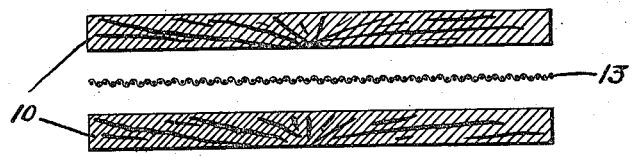
Figure 5:
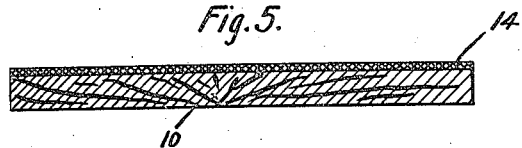

In the drawings illustrative of my invention; Figure 1 is a vertical sectional view taken through a three-layer piece of compound lumber, in which the layers are joined by a binder sheet comprising paper and a suitable adhesive; Fig. 2 is a plan view of the structure shown in Fig. 1, parts being broken away to show the several layers of wood and the several sheets of binding material; Fig. 3 is a view corresponding to Fig. 1 but illustrating the employment of adhesive-impregnated cotton batting as the binder material; Fig. 4 is a vertical sectional view taken through two sheets of wood and a binder sheet of adhesive impregnated fabric, showing the various sheets in superimposed but spaced relation to clearly bring out the method employed, and Fig. 5 is a sectional view showing how a surface covering, for wood or other material, may be provided by utilizing my improved binder sheets.

In Figs. 1 and 2 I have illustrated a sample of compound lumber consisting of a plurality of sheets 10 of wood joined by binder sheets 11 formed of paper impregnated with a suitable adhesive, a phenolic condensation product being preferred. As shown in Fig. 2, the direction of the grain of the wood is at substantially right angles in the successive sheets embodied in the structure, as is common in the manufacture of compound lumber. This obviously gives added strength to the completed structure and tends to prevent warping.

In Fig. 3 I have illustrated a structure including the various layers or sheets of wood 10 united by interposed binder sheets 12 of cotton batting impregnated with a suitable adhesive, such as a phenolic condensation product.

The method of forming such structures is best illustrated in Fig. 4 which shows a binder sheet 13 of fabric, impregnated with an adhesive, such as a phenolic condensation product, interposed between two strips or sheets of wood 10, the binder sheets being cut to the size and shape of the wooden sheets. This binder sheet is placed upon one of the wooden sheets and the other wooden sheet is placed upon it. The structure, thus provided, is then subjected to the combined action of heat and pressure until the phenolic condensation product has first softened to intimately engage the wooden sheets and has then hardened to firmly join the layers together. Obviously, any number of sheets of wood or other material may be employed and the grain of the wood may be disposed in any desired direction in the various layers.

It is to be understood that my invention is adapted and intended for use in joining together solid bodies of any desired form and dimensions and of any physical and chemical composition and characteristics; the term "compound lumber," which I have employed to designate the product of my method, being intended to cover and include all plural-layer products, the layers of which are joined together by a binder-impregnated sheet that is applied in an inert state and then made active, provided, of course, that the united bodies, whether of like or unlike thickness, shall be thicker than the binder sheet, which constitutes a part of the structure only in the sense and to the extent that it is a uniting agent.

My improved binder sheets, in addition to their use in forming compound lumber, may also be employed with great success as surfacing sheets for structures of wood and other materials. Oftentimes it is advisable to provide the surface of a wooden structure, such, for instance, as a table, with a moisture, oil and acidproof covering. This may be done, as shown in Fig. 5, by applying a sheet 14 of fibrous material impregnated with a phenolic condensation product as a binder, to the surface to be protected and then hardening such sheet by subjecting it to heat while pressing it against the surface. An oiled metal plate placed against the exposed surface of the sheet 14 during this hardening of the binder, will insure a highly polished smooth surface that may have any desired color or colors by the addition of suitable coloring material or materials to the liquid binder with which the sheet material is impregnated.

Obviously, my method of building compound lumber is susceptible of modifications not specifically set forth and, consequently, no limitations are to be imposed upon my invention that are not set forth in the claims.

I claim as my invention:

1. The method of making compound lumber which comprises positioning inert binder-impregnated sheet material, between bodies of material to be united and treating the assembled elements to render the binder active.

2. The process of producing compound lumber which comprises interposing a binder-impregnated fibrous material (the binder being in an inert state) between layers of non-adhesive material to be united and applying heat and pressure to first render the binder active and then to harden it and unite the layers.

3. The process of producing compound lumber which comprises interposing an inert binder-impregnated and dried sheet of fibrous material between layers of non-adhesive material to be united, rendering the binder active and applying pressure to cause uniting of the layers.

4. The process of producing compound lumber which comprises interposing a fibrous sheet, impregnated with a phenolic condensation product in an inert condition, between layers of non-adhesive material to be united and applying heat and pressure to the article to first soften the condensation product and thus make it active and to thereafter harden it.

5. The method of uniting a solid non-adhesive body and a binder-impregnated and dried sheet of fibrous material which consists in placing said body and said sheet in surface engagement and then applying heat and pressure to cure and harden the binder and to compact the sheet.

6. The method of uniting a solid non-adhesive body and an inert binder-impregnated and dried sheet of fibrous material which consists in assembling said body and sheet in surface engagement and then applying heat and pressure to render the binder active and effect an inseparable union between the sheet and the non-adhesive body.

In testimony whereof, I have hereunto subscribed my name this 28th day of Feb. 1918.

JOHN R. McCLAIN.